United States Patent
Canard et al.

(10) Patent No.: US 7,584,363 B2
(45) Date of Patent: Sep. 1, 2009

(54) FAIR BLIND SIGNATURE PROCESS

(75) Inventors: Sébastien Canard, Caen (FR); Matthieu Gaud, Courseulles sur Mer (FR); Jacques Traore, Saint Georges des Groseillers (FR)

(73) Assignee: France Telecom, Paris (FR)

( * ) Notice: Subject to any disclaimer, the term of this patent is extended or adjusted under 35 U.S.C. 154(b) by 866 days.

(21) Appl. No.: 11/070,033

(22) Filed: Mar. 2, 2005

(65) Prior Publication Data

US 2005/0278536 A1    Dec. 15, 2005

(30) Foreign Application Priority Data

Mar. 2, 2004   (EP) ................. 04290558

(51) Int. Cl.
  *H04L 9/00*    (2006.01)
(52) U.S. Cl. .............. 713/180; 713/176; 380/28; 380/44; 726/10; 726/19
(58) Field of Classification Search ........... 713/180, 713/176; 380/28, 44; 726/10, 19
  See application file for complete search history.

(56) References Cited

U.S. PATENT DOCUMENTS

| | | | | |
|---|---|---|---|---|
| 4,914,698 A | * | 4/1990 | Chaum | 380/30 |
| 4,926,480 A | * | 5/1990 | Chaum | 705/69 |
| 4,949,380 A | * | 8/1990 | Chaum | 380/30 |
| 5,521,980 A | * | 5/1996 | Brands | 380/30 |
| 5,832,089 A | * | 11/1998 | Kravitz et al. | 705/69 |

FOREIGN PATENT DOCUMENTS

EP    0 139 313 B1    5/1985

OTHER PUBLICATIONS

Li et al., "Fair Blind Proxy Blind Signature Scheme with the Property of Proxy Revocation", Dec. 2005, Information, Communications and Signal Processing, 2005 Fith International Conference, pp. 459-463.*

Lee et al., "Traceability of Double Spending in Secure Electronic Cash System", Oct. 2003, Computer Networks and Mobile Computing, pp. 330-333.*

(Continued)

*Primary Examiner*—Tongoc Tran
(74) *Attorney, Agent, or Firm*—Cohen Pontani Lieberman & Pavane LLP (57) ABSTRACT

In a fair blind signature process, a user interacts with a signer in order to complete a 7-tuple $(A,e,s,t,x_u,x,m)$ such that $A^e = a_0 a_1^x a_2^m a_3^{x_u} a_4^t a_5^s \pmod{n}$, where $a_0, a_1, a_2, a_3, a_4$ and $a_5$ and n are elements of the Signer's public key $(PUBK_s)$. During the signature-issuing phase the user (U) provides the signer (S) with a data element $(a_1^x)$ encrypted according to a key (f) known to a trusted authority (TA), and this data element $(a_1^x)$ is disclosed during transmission of the signed message. Similarly, the signed message is transmitted associated with second encrypted data comprising a second data element $(a_3^{x_u})$ encrypted according to a key (f) known to the trusted authority (TA), and this second data element $(a_3^{x_u})$ is disclosed to the Signer during the signature-issuing phase. Thus, the trusted authority (TA) can revoke the anonymity of the digital signature.

15 Claims, 1 Drawing Sheet

OTHER PUBLICATIONS

M. Stadler et al., "Fair Blind Signatures", Lecture Notes in Computer Science vol. 921, Springer-Verlag 1995, pp. 209-219.

A. Fiat et al., "How To Prove Yourself: Practical Solutions to Identification and Signature Problems", Lecture Notes in Computer Science, vol. 263 Springer-Verlag 1998, pp. 186-194.

G. Poupard et al., "Security Analysis of a Practical 'on the fly' Authentication and Signature Generation", Lecture Notes in Computer Science, vol. 1403 Springer-Verlag 1998, pp. 422-436.

M. Girault, "An Identity-based Identification Scheme Based on Discrete Logarithms Modulo a Composite Number", Lecture Notes in Computer Science, vol. 473 Springer-Verlag 1998, pp. 481-486.

T. El Gamal et al., "A Public Key Cryptosystem and a Signature Based on Discrete Logarithms", Lecture Notes in Computer Science, vol. 196 Springer-Verlag 1998, pp. 10-18.

J. Camenisch et al., "Efficient Group Signature Schemes for Large Groups", Lecture Notes in Computer Sciences, vol. 1294, Springer-Verlag 1997, pp. 410-424.

A. Shamir, "How to Share a Secret", Proc. Of Communications of the ACM, pp. 612-613, 1979.

P-A Fouque, et al. "Fully Distributed Threshold RSA under Standard Assumptions", Lecture Notes in Computer Science, vol. 2248, Springer-Verlag, pp. 310-330.

Abe et al., "Provably Secure Fair Blind Signatures with Tight Revocation", Lecture Notes in Computer Science, vol. 2248, Springer-Verlag 2001, pp. 583-601.

Maitland et al., "Fair Electronic Cash Based on a Group Signature Scheme", Lecture Notes in Computer Science, vol. 2229, Springer-Verlag 2001, pp. 461-465.

Qiu et al., "A New Offline Privacy Protecting E-cash System with Revokable Anonymity", Lecture Notes in Computer Science, vol. 2433, Springer-Verlag 2002, pp. 177-190.

Maitland et al., "A Provably Secure Restrictive Partially Blind Signature Scheme", Lecture Notes in Computer Science, vol. 2274, Springer-Verlag 2002, pp. 99-114.

\* cited by examiner

FIG.1

FAIR BLIND SIGNATURE PROCESS

FIELD OF THE INVENTION

The present invention concerns the security of electronic transactions and, more especially, the present invention relates to the technical field of digital signatures.

BACKGROUND OF THE INVENTION

A digital signature scheme is a public key cryptographic protocol involving a user and a signer. The signer owns a secret key and an associated public key. The user generates a message, generally for transmission over a network, such as the Internet. The signer uses his secret (or private) key to produce the digital signature of the message as an indication of the validity or authenticity of the message. Anyone who wishes to verify the authenticity of the signature can do so using only the signer's public key.

In conventional digital signature schemes the signer knows the content of the message to which the digital signature is being applied, and a signature algorithm (e.g. the well-known RSA algorithm) is used to generate a digital signature which is difficult or impossible to forge.

In a blind signature scheme, the user can obtain a digital signature on his message without letting the signer have information on the content of the message. A well-known blind signature scheme, developed by Prof. Dr. David Chaum, is described in EP-A-0 139 313. Blind signature schemes are often proposed for use in digital cash applications so as to enable an individual to purchase digital cash from a financial institution in a manner which prevents the financial institution from being able to trace the subsequent use of that cash.

In an ordinary blind signature scheme, if the signer signs a number of documents for different users then, when he is presented with one particular document that he has signed, he will not be able to determine when or for whom he signed that document. By way of contrast, in a fair blind signature scheme (FBSS), there is an additional participant, one or more trusted authorities (or "judges"), and the signer can identify which signature resulted from a given signing session with the help of the trusted authority (or of a quorum of trusted authorities if there is more than one).

If the signer has a transcript of a particular signing session then, with the help of the trusted authority, he can identify the signature-message pair resulting from that session: this is termed "signature tracing". Conversely, if the signer has available a particular message-signature pair then, with the help of the trusted authority, he can determine the signing session at which this was generated: this is termed "session tracing".

One component used in fair blind signature schemes is "zero-knowledge proofs of knowledge". One entity (the "prover") may need to prove to another entity (the "verifier") that a certain statement (or predicate) is true. If the prover and verifier can perform an appropriate interactive procotol (an interactive proof of knowledge), the verifier can be convinced of the truth of the statement. The proof of knowledge protocol is termed "zero-knowledge" if, even after taking part in the proof of knowledge, the verifier has no knowledge of what the statement is (the verifier merely knows that it is true or "valid"). In the latter case, the verifier cannot himself prove the validity of the statement to others.

Although fair blind signature schemes enable a given digital signature to be linked to a given user, the user's message still remains private. Fair blind signature schemes have mainly been proposed in the context of applications where revocable anonymity is desirable, such as electronic auctions, and the fight against organized crime (e.g. the prevention of money laundering).

In order to be secure, a fair blind signature scheme should possess the properties of one-more unforgeability, blindness and traceability (tight revocation).

"One-more unforgeability" denotes the fact that it is computationally difficult to produce a $k+1^{th}$ valid signature under the fair blind signature scheme even if the intending forger has interacted with the signer k times (this can be designated "(k,k+1)-unforgeability"). This property should hold even if the interactions between the intending forger and the signer are performed in an adaptive and interleaving manner.

"Blindness" denotes the property whereby it is computationally difficult for anyone (other than the trusted authority) who is provided with a particular valid digital signature to generate information which enables identification of the user who conducted the signing session which yielded that signature. Similarly, it is computationally difficult for anyone (other than the trusted authority) who is provided with a transcript of a particular signing session to identify the signature which was produced in that session.

"Traceability (tight revocation)" denotes the property whereby it is difficult for anyone (except for the signer) to circumvent the tracing procedures built into the fair blind signature scheme. More particularly, it is computationally difficult for everyone (except the signer) to output a valid signature that cannot be traced by the trusted authority or that cannot be matched by the trusted authority to the corresponding user.

Various fair blind signature schemes have been proposed. See, for example, "Fair Blind Signatures" by M. Stadler et al, in Advances in Cryptology,—Eurocrypt '95, volume 921 of Lecture Notes in Computer Science, pp 209-219, Berlin, Springer-Verlag. However, most of the proposed schemes are either inefficient, insecure or only proven to be secure if non-standard assumptions are made.

One efficient fair blind signature scheme has been proposed by Abe and Ohkubo (see "Provably Secure Fair Blind Signatures with Tight Revocation" in Proceedings of Asiacrypt '01, volume 2248 of Lecture Notes in Computer Science, pp 583-601, Berlin, Springer-Verlag). The security of this scheme (that is, the unforgeability of the signatures) relies on the discrete logarithm problem. Although this scheme is claimed to offer polynomial security, in fact it only offers poly-logarithmic security (that is, only a poly-logarithmic number of signatures can be securely issued: this poly-logarithmic number being defined in terms of a security parameter).

The preferred embodiments of the present invention provide a fair blind signature scheme that is efficient and that allows a polynomial number of signatures to be securely issued.

Further features and advantages of the present invention will become apparent from the following description of a preferred embodiment thereof, given by way of example, illustrated by the accompanying drawing which indicates the main elements of the fair blind signature scheme of the preferred embodiment.

Before providing a detailed description of the fair blind signature process according to a preferred embodiment of the present invention, it is useful to recall certain basic principles of fair blind signature schemes and some mathematical notation.

It is considered unnecessary to give a formal definition of a fair blind signature scheme (FBSS) here because this is well-known in this field. However, the interested reader can refer to the Abe and Ohkubo paper cited above for such a definition, if desired.

It is considered sufficient to recall here that a FBSS involves three types of participants: users, U, who wish to have messages signed, a signer (s) who produces the blind digital signatures, and a trusted authority (TA) who can also be called a "judge". In the fair blind signature scheme of the present invention three different kinds of protocols are used: a signature issuing protocol conducted between the user and the signer, allowing the user to obtain a signature of a message of his choice, a signature-submission protocol conducted between the user and anyone, allowing the user to submit a signature with a message, and the tracing protocols in which there is a signature-tracing protocol and/or a session-tracing protocol both conducted between the signer, S, and the trusted authority, TA.

It should be noted that the session-tracing protocol used in the preferred embodiment of the present invention enables the trusted authority to determine from a particular message-signature pair the identity of the user who conducted the signing session which led to generation of that pair. Thus, this preferred protocol can be designated a "user-tracing" protocol. In practice, tracing of the user is more useful than merely identifying the signing session that resulted in the generation of a particular message-signature pair. (In some schemes, it is necessary to search through a large database in order to determine which user conducted the signing session which has been identified by a true session-tracing protocol.)

In the description below the following mathematical notation will be used:

$x \in_R E$ means that x is chosen uniformly, at random, from the set E—in other words x is chosen at random from the set E according to the uniform distribution.

If x is an integer, |x| denotes the binary size (or length) of x.

The set $I_d$, means the set of integers running from 0 to d−1, in other words, it corresponds to the set $\{0, 1, 2, \ldots, d-1\}$.

For an integer n, $\mathbb{Z}_n$ denotes the residue class ring modulo n, and $\mathbb{Z}_n^*$ denotes the multiplicative group of invertible elements in $\mathbb{Z}_n$.

For an element $\alpha$ which is chosen uniformly at random in the set $\mathbb{Z}_n$ (in other words, for $\alpha \in_R \mathbb{Z}_n$), the order of $\alpha$ in $\mathbb{Z}_n^*$ is denoted ord ($\alpha$).

The subgroup of $\mathbb{Z}_n^*$ generated by an element $\alpha$ chosen uniformly at random in $\mathbb{Z}_n^*$ (in other words, generated by $\alpha \in_R \mathbb{Z}_n^*$) is denoted $\langle\alpha\rangle$.

The set QR(n) denotes the set of all quadratic residues modulo n.

The symbol || denotes the concatenation of two (binary) strings (or of binary representations of integers and group elements).

The symbol H denotes any convenient hash function.

SK($\alpha$:f($\alpha$, ... ))(m) denotes a "signature of knowledge" on message m. By providing the signature of knowledge, SK, a prover demonstrates to a third party ("the verifier") that he knows a value, $\alpha$, which satisfies the equation defining the predicate, f.

SK($\alpha,\beta$:f($\alpha$, ... )^g($\beta$, ... ))(M) denotes a "signature of knowledge" on message M, demonstrating that the prover knows values $\alpha$ and $\beta$ which satisfy the equation defining f and the equation defining g.

A "signature of knowledge" is a signature derived from a zero-knowledge proof of knowledge using the well-known Fiat-Shamir heuristic (see "How to Prove Yourself: Practical Solutions to Identification and Signature Problems" by A. Fiat and A. Shamir in Proceedings of Crypto '86, vol.263 of Lecture Notes in Computer Science, pp 186-194, Berlin, Springer-Verlag, 1987). If the underlying proof of knowledge is secure, a signature of knowledge derived therefrom can be shown to be secure in the random oracle model.

Depending upon the nature of the predicate(s), f, g, etc. referred to in the signature of knowledge, the prover will need to transmit different information to the verifier in order to establish the zero-knowledge proof of knowledge. Starting at page 13, some examples will be given of typical predicates and the information that can be transmitted by a prover in order to prove possession of a value which satisfies the associated predicate.

DETAILED DESCRIPTION OF THE SINGLE DRAWING

A fair blind signature scheme according to a preferred embodiment of the invention will now be described with reference to FIG. 1. It will be recalled that this system involves a signer, S, who issues digital signatures, a plurality of users, U, who seek to obtain (fair blind) digital signatures on their respective messages, and one or more trusted authorities, TA, who can enable the anonymity of the digital signatures to be revoked.

Figure 1:
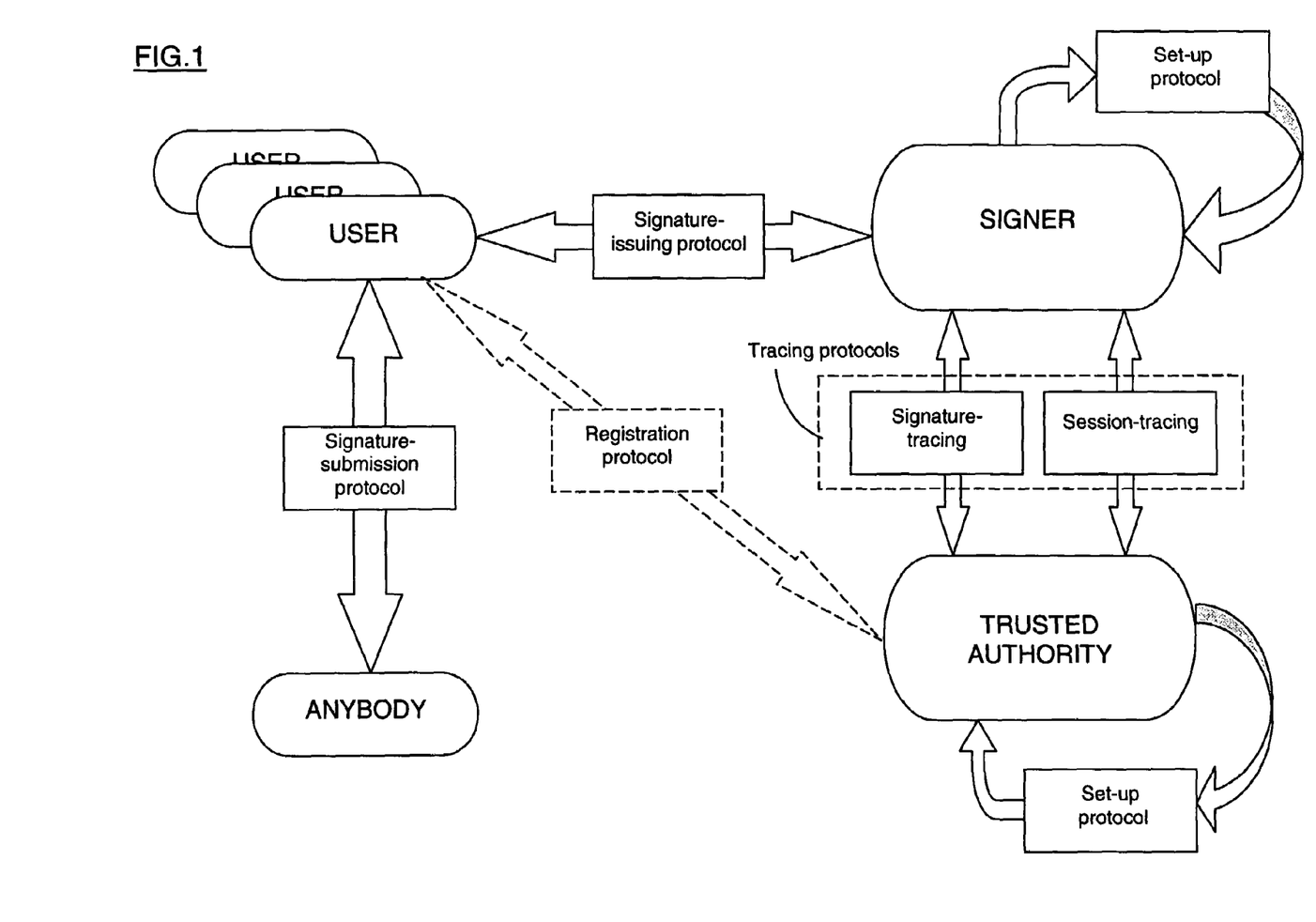
FIG. 1 is a diagram indicating the main processes and protocols used to implement a fair blind signature scheme according to the preferred embodiment of the present invention.

As can be seen from FIG. 1, there is an initial, set-up phase in which values for certain of the scheme parameters are determined. During this set-up phase, values are selected (by the system designer) for first and second security parameters $l$ and $l_p$. Then, the signer, S, chooses random secret prime numbers p' and q' each having a number of bits equal to the security parameter $l_p$. p' and q' are chosen such that the values p=2p'+1 and q=2q'+1 are both prime numbers. The signer will use $PRK_s$=(p', q') as his private key (or "secret key"). The modulus n is set to the value n=pq, and further parameters N and $I_n$ are determined according to the following equations:

$$N = \lfloor n/4 \rfloor = p'q' + \frac{p' + q'}{2} \text{ and } l_n = 2l_p$$

The signer, S, also chooses random generators ($a_0$, $a_1$, $a_2$, $a_3$, $a_4$, $a_5$, g, h) of QR(n) such that the discrete logarithm of each of these random generators with respect to the others is unknown.

In the set-up phase, the Trusted Authority selects $y \in_R I_N$ (in other words TA chooses a value for parameter y by choosing uniformly at random in the set $\{0, 1, \ldots, N-1\}$). This parameter y will be the Trusted Authority's private key. Then TA computes its public key f, as follows: $f=g^y \pmod{n}$.

The public key of the overall fair blind signature system is PUBK=(n, $a_0$, $a_1$, $a_2$, $a_3$, $a_4$, $a_5$, f, g, h). The signer's public key will be the same as that of the overall system but without the values f: that is it is equal to (n, $a_0$, $a_1$, $a_2$, $a_3$, $a_4$, $a_5$, g, h).

Table 1 below summarizes some of the parameters which have had values defined during the set-up phase.

TABLE 1

| Parameter | Symbol | Value |
|---|---|---|
| first security parameter | l | (typically) 160 |
| second security parameter | $l_p$ | (typically) 1024 |
| modulus | n | pq |
| the Signer's private key, | $PRK_S$ | (p', q') |
| The Signer's public key | $PUBK_S$ | (n, $a_0$, $a_1$, $a_2$, $a_3$, $a_4$, $a_5$, g, h) |
| Random generators of QR(n) chosen by Signer | ($a_0$, $a_1$, $a_2$, $a_3$, $a_4$, $a_5$, g, h) | |
| the Trusted Authority's private key | $PRK_{TA}$ | y (chosen uniformly, at random, in the set of integers 0 to N − 1) |
| the Trusted Authority's public key | $PUBK_{TA}$ | $f = g^y \pmod{n}$. |
| The public key of the overall FBSS | PUBK | (n, $a_0$, $a_1$, $a_2$, $a_3$, $a_4$, $a_5$, f, g, h) |

After the set-up phase, the fair blind signature system of the present invention is ready for use, that is, the Signer is ready to digitally sign messages for Users.

Although it is not essential to the present invention, it can be useful for Users to register with the system. This enables the system to perform user tracing rather than just session-tracing. Thus, the FBSS of the preferred embodiment of the present invention includes a registration phase, as indicated in FIG. 1 by the box in dashed lines.

In the registration phase, the user, U, chooses a secret value $x_u \in_R I_N$ (in other words U chooses a value for parameter $x_u$ by choosing uniformly at random in the set $\{0, 1, \ldots, N-1\}$). U then computes a code $Id_U$ to identify himself:

$$Id_U = a_3^{x_u} \pmod{n}.$$

The User then proves to the Trusted Authority that he knows the discrete logarithm of $Id_U$ in the base $a_3$. This can be done using any convenient procedure (see, for example, "Security Analysis of a Practical "on the fly" Authentication and Signature Generation" by G. Poupard and J. Stern in Proceedings of Eurocrypt '98, vol.1403, Lecture Notes in Computer Science, pp 422-436, Berlin, Springer-Verlag, 1998; or "An Identity-based Identification Scheme Based on Discrete Logarithms Modulo a Composite Number" by M. Girault, in Proceedings of Eurocrypt 1990, vol.473 of Lecture notes in Computer Science, pp 481-486, Berlin, Springer-Verlag). The Trusted Authority then publishes both $Id_U$ and the proof provided by the User, thus enabling the user to be authenticated during execution of the signature-issuing protocol (see below). The registration phase is now complete.

As FIG. 1 indicates, the fair blind signature scheme of the preferred embodiment includes a signature issuing protocol, a signature submission protocol, and tracing protocols which include a signature-tracing protocol and/or a session-tracing protocol (here, a user-tracing protocol). Clearly the signature-issuing protocol is used each time a User contacts a Signer for signature of a message and the signature submission protocol is used every time a User supplies a signed message to a third party, whereas the signature-tracing and session-tracing protocols are only invoked in a case where it is desired to revoke the anonymity of a digital signature (for example, because it is desired to retrieve the details of a successful bidder in an on-line auction). These protocols shall now be considered in turn.

Signature-issuing Protocol

Four length parameters $l_r$, $l_m$, $l_e$, and $l_s$, are defined so as to satisfy the following three relationships:

$$l_r = \max(l_m, l_N)$$

$$l_e \geq l_r + 2$$

$$l_s \geq l_n + l_r + l + 3$$

where l is the first security parameter, $l_n$ is the bit-length of the modulus n, and $l_N$ is the bit-length of the parameter N mentioned in the above discussion of the set-up phase. The message, m, to be signed is a message of bit-length $l_m$, in other words m can be an integer in the set $\{0, 1, \ldots, (2^{l_m}-1)\}$. In the preferred embodiment of the invention it is the Signer who fixes the values of these length parameters, however the invention is not limited to this possibility. In other embodiments of the invention other parties, for example the Trusted Authority, could set the values of these length parameters.

The signature-issuing protocol, which is interactively performed by the User and Signer can be considered to be a two-part protocol. In the first part of the signature-issuing protocol, the User and Signer interact and the User obtains from the Signer certain parameter data (notably $\hat{x}$, A, e and s). In the second part of the signature-issuing protocol, the User generates the desired digital signature making use of the parameter data obtained from the Signer.

In the first part of the signature-issuing protocol, the following steps are performed:

The User selects a parameter $\tilde{x}$ and a parameter $\tilde{r}$ uniformly, at random, from the set $\{0, 1, \ldots, N-1\}$—in other words $\tilde{x} \in_R I_N$ and $\tilde{r} \in_R I_N$.

The User generates a parameter $C_1$ and two signatures of knowledge, $U_0$ and $U_1$, as follows:

$$C_1 = g^{\tilde{x}} h^{\tilde{r}} \pmod{n},$$

$$U_0 = SK(\alpha, \beta : C_1 = g^\alpha h^\beta \pmod{n} \wedge \alpha \in I_N), \text{ and}$$

$$U_1 = SK(\alpha : Id_U = a_3^\alpha \pmod{n} \wedge \alpha \in I_N),$$

The User then transmits $C_1$, the User's Identification code, $Id_U$, and the two signatures of knowledge, $U_0$ and $U_1$, to the Signer.

The Signer verifies the two signatures of knowledge, $U_0$ and $U_1$. Then, if the signatures of knowledge have been successfully verified, the Signer sets a value for a parameter $\hat{x}$, by choosing uniformly, at random, in the set $\{0, 1, \ldots, N-1\}$—in other words $\hat{x} \in_R I_N$. This parameter is transmitted back to the User.

The User then employs the parameter $\hat{x}$ received from the Signer so as to generate a further parameter $x = \tilde{x} + \hat{x} \pmod{n}$.

The User next selects a parameter t and a parameter r uniformly, at random, from the set $\{0, 1, \ldots, N-1\}$—in other words $t \in_R I_N$ and $r \in_R I_N$.

The User then calculates three further parameters $C_2$, $E_1$ and $E_2$, and two further signatures of knowledge, V and W, as follows:

$$C_2 = a_1^x a_2^m a_4^t \pmod{n},$$

$$E_1 = a_1^x f^r \pmod{n},$$

$$E_2 = g^r \pmod{n},$$

$$V = SK(\alpha, \beta, \gamma, \delta: C_2 = a_1^\alpha a_2^\beta a_4^\gamma \wedge E_1 = a_1^\alpha f^\delta \wedge E_2 = g^\delta \wedge \beta \in I_{2^{l_m}} \wedge \gamma \in I_N), \text{ and}$$

$$W = SK(\alpha, \beta, \gamma, \delta, \theta: C_2 = a_1^\alpha a_2^\theta a_4^\delta \wedge C_1 g^x = (g^N)^\beta g^\alpha h^\gamma \wedge \alpha \in I_N \wedge \delta \in I_N \wedge \theta \in I_{2^{l_m}}).$$

It will be noticed that the parameter $E_1$ corresponds to the data $a_1^x$ encrypted according to the Trusted Authority's public key, f. The User transmits these three parameters and two signatures of knowledge ($C_2$, $E_1$, $E_2$, V, W) to the Signer.

The Signer verifies the two signatures of knowledge, V and W. If both of these signatures of knowledge are valid then the Signer then selects a first parameter s uniformly, at random, in the set $\{0, 1, \ldots, (I_{2^{l_s}}-1)\}$ and a second parameter e uniformly, at random, in the set consisting of the primes between $2^{l_e-1}$ and $2^{l_e}$—in other words:

$$s \in_R I_{2^{l_s}}$$

$$e \in_R ]2^{l_e-1}, 2^{l_e}[ \text{ a prime}$$

The Signer then calculates a parameter A, as follows:

$$A = (a_0 C_2 \alpha_5^s Id_U)^{1/e} (\bmod n)$$

The Signer transmits A, e and s to the User who verifies that the following relationships hold true:

$$A^e = a_0 a_1^x a_2^m a_3^{x_u} a_4^t a_5^s (\bmod n)$$

$$e \in ]2^{l_e-1}, 2^{l_e}[$$

These latter two verifications bring the first part of the signature-issuing protocol to an end.

In the second part of the signature-issuing protocol the User generates the real digital signature of his message, m. This involves generating the following elements (which constitute a valid digital signature for a message m that is an integer in the set $\{0, 1, \ldots, (2^{l_m}-1)\}$, according to this preferred FBSS):

a value $I_{sig}$ an ElGamal ciphertext $E=(E_3, E_4)$ a signature of knowledge, P, which proves that U knows the tuple $(A,e,s,t,x_u,x)$ such that:

($P_1$): $I_{sig}=(\alpha_1^x \bmod n)$ and $x \in I_N$ ($P_2$): $A^e = a_0 I_{sig} a_2^m a_4^t a_5^s a_3^{x_u} (\bmod n)$ and that $x_u$ and t belong to $I_N$ and s belongs to $I_{2^{l_s}}$.

($P_3$): E is an encryption of $a_3^{x_u} (\bmod n)$

The nature of an ElGamal ciphertext is well-known to the skilled person in this field and so will not be explained in detail here. However, further information can be found, if desired, in "A Public Key Cryptosystem and a Signature Scheme Based on Discrete Logarithms" by T. El Gamal, eds. G. R. Blakley and D. Chaum, in Proceedings of Crypto '84, vol.196, Lecture Notes in Computer Science, pages 10-18, Springer-Verlag, 1985.

A signature SK on m is valid if its proof of knowledge PK is valid. Although a User can produce several different signatures of knowledge, SK, a digital signature on message m is uniquely determined by the value $I_{sig}$, which has been jointly computed by the User and the Signer. If two signatures on m have respective different $I_{sig}$ values then these signatures will be considered to be different. If two signatures on m have the same values for $I_{sig}$ then they will be considered to be equal even if their respective signatures of knowledge SK are different.

According to the preferred embodiment of the present invention, a suitable signature of knowledge SK can be constructed, as follows:

The User calculates $I_{sig}=a_1^x (\bmod n)$.

The User selects three parameters, w, $w_1$ and $w_2$ uniformly, at random, within the set $\{0, 1, \ldots, I_N-1\}$, in other words w, $w_1, w_2 \in_R I_N$.

The User then calculates the ElGamal cyphertext $E_3, E_4$, and two other parameters $D_1$ and $D_2$, as follows:

$$E_3 = a_3^{x_u} f^w (\bmod n)$$

$$E_4 = g^w (\bmod n)$$

$$D_1 = A h^{w_1} (\bmod n)$$

$$D_2 = g^{w_1} h^{w_2} (\bmod n)$$

The signature of knowledge, SK, is then defined, as follows:

$$P = SK(\alpha, \beta, \gamma, \delta, \eta, \zeta, \theta, \iota, \epsilon, \mu: I_{sig} = a_1^\alpha \wedge E_3 = a_3^\epsilon f^\iota \wedge E_4 = g^\gamma \wedge a_0 I_{sig} a_2^m = D_1^\beta / (a_3^\epsilon a_4^\delta a_5^\mu h^\eta) \wedge D_2 = g^\zeta$$
$$h^\theta \wedge 1 = D_2^\beta / (g^\eta h^\iota) \wedge \beta \in ]2^{l_e-1}, 2^{l_e}[ \wedge \mu \in I_{2^{l_s}} \wedge \alpha \in I_N \wedge \epsilon \in I_N \wedge \delta \in I_N)(m).$$

Although the above signature of knowledge has a superficial appearance of complexity, the skilled person will readily appreciate that it amounts to a signature of knowledge showing that the User knows values $\alpha, \beta, \gamma, \delta, \eta, \zeta, \theta, \iota, \epsilon$ and $\mu$ satisfying the 11 predicates on the right-hand side of the colon in the above definition.

The skilled person will readily understand from his common general knowledge in this field what data must be transmitted to the verifier in order to prove a predicate of a particular type from the signature of knowledge, SK. Indeed, there is an extremely large number of technical articles in this field giving details on how to generate signatures of knowledge proving possession of secret pieces of knowledge of different types, see, for example, "Efficient Group Signature Schemes for Large Groups" by J. Camenisch and M. Stadler in Advances in Cryptology—CRYPTO '97, vol.1294 of Lecture Notes in Computer Sciences, pp. 410-424, Springer Verlag, 1997.

However, it may be helpful to recall here some of the signatures of knowledge appropriate for proving that a prover is in possession of an associated secret piece of knowledge when that secret piece of knowledge takes certain particular forms (see below). These can be considered to be building blocks that are used in the preferred embodiment of the present invention.

Building Block 1—User Knows x Which is the Discrete Logarithm of y With Respect to Base g Consider the case where the User knows the discrete logarithm, x, of a number y with respect to a base g (that is, $y=g^x$), both g and y being members of a group G.

If the User wishes to prove that he knows x (which is the discrete logarithm of y with respect to base g) without divulging this value x, then he can do so, as follows. First he selects a parameter r uniformly at random from the set $\{0, 1, \ldots, I_{\epsilon(l_G+k)}-1\}$, then he determines the value of two evidence parameters, c and s, according to $c=H(g\|y\|g^r\|m)$, and $s=r-cx$ (in $\mathbb{Z}$). If the prover truly knows the discrete logarithm value, x, and has used the appropriate value when generating the evidence parameters c and s then the data pair (c,s) will satisfy the equation $c=H(g\|y\|y^c g^s\|m)$, wherein c and s are each members of the set $I_k \times I_{\epsilon(l_G+k)+1}$.

Thus if the user generates a signature of knowledge containing a value of this data pair (c,s) which satisfies $c=H(g\|y\|y^c g^s\|m)$, then this proves that the User knows the discrete logarithm of y with respect to base g, on a message m $\in\{0, 1\}^*$. The corresponding signature of knowledge can be denoted $SK(\alpha: y=g^\alpha)(m)$.

Building Block 2—User Knows x Which is the Discrete Logarithm of $y_1$ With Respect to Base g AND is the Discrete Logarithm of $y_2$ With Respect to Base h In this case the User knows that $y_1=g^x$ and that $y_2=h^x$. The User can demonstrate possession of this knowledge without divulging x as follows.

First he selects a parameter r uniformly at random from the set $\{0, 1, \ldots, 1_{\epsilon(l_G+k)}-1\}$, then he determines the value of two evidence parameters, c and s, according to $c=H(g\|h\|y_1\|y_2\|g^r\|h^r\|m)$, and $s=r-cx$ (in $\mathbb{Z}$). If the prover truly knows the discrete logarithm value, x, and if this discrete logarithm of $y_1$ with respect to base g is the same as the discrete logarithm of $y_2$ with respect to h, and the prover has used the appropriate value of x when generating the evidence parameters c and s then the data pair (c,s) will satisfy the equation $c=H(g\|h\|y_1\|y_2\|y_1^c g^s\|y_2^c h^s\|m)$, wherein c and s are each members of the set $I_k \times I_{\epsilon(l_G+k)+1}$.

Thus if the user generates a signature of knowledge containing a value of this data pair (c, s) which satisfies $c=H(g\|h\|y_1\|y_2\|y_1^c g^s\|y_2^c h^s\|m)$, then this proves that the User knows both the discrete logarithm of $y_1$ with respect to base g and the discrete logarithm of $y_2$ with respect to base h, on a message $m \in \{0, 1\}^*$. The corresponding signature of knowledge can be denoted $SK(\alpha, \beta: y_1=g_1^\alpha \wedge y_2=g_2^\beta)(m)$.

Building Block 3—User Knows $x_1$, $x_2$ Which is the Representation of y With Respect to Base g and Base h In this case the User knows that $y=g^{x_1}h^{x_2}$. The User can demonstrate possession of this knowledge without divulging $x_1$ and $x_2$ as follows.

First he selects two parameters $r_1$, $r_2$ uniformly at random from the set $\{0, 1, \ldots, I_{\epsilon(l_G+k)}-1\}$, then he determines the value of three evidence parameters, c, $s_1$ and $s_2$, according to $c=H(g\|h\|y\|g^{x_1}h^{x_2}\|m)$, $s_1=r_1-cx_1$ and $s_2=r_2-cx_2$ (in $\mathbb{Z}$). If the prover truly knows the representation of y with respect to base g and base h, and has used the appropriate value when generating the evidence parameters c, $s_1$ and $s_2$, then the data set (c,$s_1$,$s_2$) will satisfy the equation $c=H(g\|h\|y\|y^c\ g^{s_1}h^{s_2}\|m)$, wherein each of c, $s_1$ and $s_2$ is a member of the set $I_k \times I_{\epsilon(l_G+k)+1} \times I_{\epsilon(l_G+k)+1}$.

Thus if the user generates a signature of knowledge containing a value of this data set (c,$s_1$,$s_2$) which satisfies $c=H(g\|h\|y\|y^c\ g^{s_1}h^{s_2}\|m)$, then this proves that the User knows the representation of y with respect to base g and base h, on a message $m \in \{0, 1\}^*$. The corresponding signature of knowledge can be denoted $SK(\alpha, \beta: y=g^\alpha h^\beta)(m)$.

Building Block 4—User Knows the Discrete Logarithm of y With Respect to Base g and That This Discrete Logarithm Lies in a Particular Interval In this case the User knows that $y=g^x$ and that x is in the interval $]X-2^{\epsilon(l+k)}, X+2^{\epsilon(l+k)}[$. The User can demonstrate possession of this knowledge without divulging x, as follows.

First he selects a parameter r uniformly at random from the set $\{0, 1, \ldots, I_{\epsilon(l_G+k)}-1\}$, then he determines the value of two evidence parameters, c and s, according to $c=H(g\|y\|g^r\|m)$, $s=r-c(x-X)$ (in $\mathbb{Z}$). If the prover truly knows the discrete logarithm of y with respect to base g and the interval in which this lies, and has used the appropriate value when generating the evidence parameters c and s, then the data pair (c,s) will satisfy the equation $c=H(g\|y\|y^c g^{s-cX}\|m)$, c and s are each members of the set $I_k \times I_{\epsilon(l_G+k)+1}$.

Thus if the user generates a signature of knowledge containing a value of this data pair (c,s) which satisfies $c=H(g\|y\|y^c g^{s-cX}\|m)$, then this proves that the User knows the discrete logarithm of y with respect to base g and the interval in which this lies, on a message $m \in \{0, 1\}^*$. The corresponding signature of knowledge can be denoted:

$$SK(\alpha: y=g^\alpha \wedge \alpha \in ]X-2^{\epsilon(l+k)}, X+2^{\epsilon(l+k)}])(m).$$

Signature-submission Protocol

Returning to the fair blind signature system, FBSS, according to the preferred embodiment of the invention, once the User has completed generation of a signed message he can submit it to others as desired. An entity (such as the Signer) to whom the signed message is supplied may wish to be convinced of the validity of a particular signature generated using this FBSS. Accordingly, he may wish to verify the validity of the signature of knowledge P associated with the signed message. The signature of knowledge, P, is a combination of all the building blocks mentioned above and it can be verified using an interactive procedure involving the User (prover) and a verifier (for example, the Signer).

Tracing Protocols

Signature-tracing Protocol

When it is desired to trace a particular signature that has resulted from a given signature-issuing session, the Signer can provide the Trusted Authority with the pair ($E_1$, $E_2$) observed during that signature-issuing session and the Trusted Authority can decrypt this ciphertext to determine $I_{sig}$. Thus, the Trusted Authority can identify which signature resulted from the signature-issuing session in question.

Session-tracing Protocol

When it is desired to trace the signature-issuing session that has resulted in the generation of a particular signature, the Signer can provide the Trusted Authority with the pair ($E_3$, $E_4$) from the valid signature and the Trusted Authority can decrypt this ciphertext to determine the value $Id_u$, which identifies the User who obtained this signature.

EXAMPLES OF APPLICATIONS

The fair blind signature scheme of the present invention can be used in a wide variety of applications. Some examples of possible applications include the following (although it is to be understood that the present invention is not limited to these examples): electronic auctions, tracing of illicit financial transactions, and on-line voting methods such as that described in the applicant's co-pending European patent application entitled "Electronic Voting Process Using Fair Blind Signatures" filed simultaneously with the present application.

The present invention is not particularly limited with regard to the particular software and hardware that may be used to implement the fair blind signature scheme. The skilled person will readily understand from his common general knowledge in this field how to choose suitable software routines and hardware to implement the invention.

It should be noted, however, that the present invention can be performed using a set of co-operating suitably-programmed general-purpose computing devices, such as personal computers, web servers, personal digital assistants, network PCs, suitably-equipped mobile phones, etc. Alternatively some or all of the signature scheme may be implemented using special purpose data processing apparatus. In general, there will be one data processing/computing device for the (or each) Signer, for the (or each) Trusted Authority and for each User. However, it is to be understood that the various entities involved in the signature scheme may make use of distributed computing systems in which certain sub-routines or program modules are performed in distributed units, rather than in one centralized device.

Although the present invention has been described in terms of a particular preferred embodiment thereof, the person skilled in the art will readily understand that various features of the preferred embodiment may be varied, adapted and/or replaced by others without departing from the present invention as defined in the accompanying claims.

For example, although the above-described preferred embodiment of the FBSS according to the invention involves a User-registration phase, this can be omitted if it is deemed sufficient to be able to determine the issuing time of a target signature, based on the session logs. In other words, the User-registration phase can be omitted if it is sufficient to be able to perform "session-tracing" rather than "user-tracing".

Further, although the preferred embodiment has been described above in terms of a FBSS using a single Trusted Authority, the skilled person will readily appreciate that a set of Trusted Authorities can be used instead, and anonymity can only be revoked when a quorum of these Trusted Authorities cooperate (in other words, the signature-tracing and session-tracing protocols are implemented by a set of Trusted Authorities, rather than by a single one). The extension of the above-described FBSS to the case here there are multiple Trusted Authorities is straightforward for the skilled person so no detailed description thereof will be given here. If desired, guidance on one method for extending this technique to the case where there are multiple Trusted Authorities can be obtained from consideration of "How to Share a Secret" by A. Shamir, Proc. of Communications of the ACM, pp. 612-613, 1979.

Moreover, although the preferred embodiment has been described above in terms of a FBSS using a single entity as the Signer, the skilled person will readily appreciate that a set of entities can be used to constitute the Signer instead, and the data required by the User in order to generate a valid signature is obtained by the cooperation of a quorum of the entities constituting the Signer. In other words, the present invention can be implemented as a threshold fair blind signature scheme. The extension of the above-described FBSS to the case here the Signer is constituted by a set of entities is straightforward for the skilled person so no detailed description thereof will be given here. If desired, guidance on how to perform this extension can be found in "Fully distributed threshold RSA under standard assumptions" by P-A Fouque and J. Stern, Proc. of Asiacrypt '01, vol. 2248 of Lecture Notes in Computer Science, pp. 310-330, Springer-Verlag.

Furthermore, it is to be understood that the present invention is not particularly limited with regard to the manner in which data is passed between the various entities involved in the signature scheme. Although, in many applications, it is likely that this data transmission will take place over the Internet this is not a requirement of the present invention. In particular, other communications networks (including LANs, WANs, etc.) may be used.

We claim:

1. A method for providing a fair blind digital signature for a message in a fair blind signature scheme in which an apparatus of a user interacts with an apparatus of a signer of the message to provide the fair blind digital signature, wherein the signer has a public key and anonymity of the digital signature is revocable by a trusted authority, the method comprising:

generating, by the apparatus of the signer, first parameters comprising elements of the public key of the signer;

generating second parameters which are chosen uniformly at random by the apparatus of the signer;

generating third parameters which are chosen uniformly at random by the apparatus of the user;

calculating, by the apparatus of the user, a code to identify said apparatus of the user;

calculating, by the apparatus of the user, an intermediate value based on a parameter chosen uniformly at random by the user and on a parameter chosen uniformly at random by the apparatus of the signer;

calculating, by the user apparatus, an additional parameter in accordance with the relationship:

$C_2 = a_1^x a_2^m a_4^t \pmod{n}$; and issuing the digital signature by:

obtaining, by the apparatus of the user, data from the apparatus of the signer to complete a 7-tuple in accordance with the relationship:

$A^e = a_0 a_1^x a_2^m a_3^{x_u} a_4^t a_5^s \pmod{n}$, where $a_0$, $a_1$, $a_2$, $a_3$, $a_4$ and $a_5$ and n are said first parameters, m is said message to be signed, e and s are said second parameters, t and $x_u$ are said third parameters, x is said intermediate value, $Id_U$ is said code which identifies the apparatus of the user, $C_2$ is said additional parameter, and A is another parameter calculated in accordance with the relationship:

$A = (a_0 C_2 a_5^s Id_U)^{1/e} \pmod{n}$; and generating, by the apparatus of the user, the digital signature based on said data obtained by said apparatus of the user from the apparatus of the signer.

2. The method of claim 1, further comprising the steps of:

generating, by the apparatus of the user, encrypted data comprising an encrypted first data element;

generating fourth parameters which are chosen uniformly at random by the apparatus of the user;

calculating, by the apparatus of the user, a further parameter in accordance with the relationship $I_{sig} = a_1^x \pmod{n}$;

generating, by the apparatus of the user, a signature-of-knowledge P in accordance with the relationship:

$P = SK(\alpha, \beta, \gamma, \delta, \eta, \zeta, \theta, \iota, \epsilon, \mu : I_{sig} = \alpha_1^\alpha \wedge E_3 = a_3^\epsilon f^\iota \wedge E_4 = g^\gamma \wedge a_0 I_{sig} a_2^m = D_1^\beta / (a_3^\epsilon a_4^\delta a_5^\mu h^\eta) \wedge D_2 = g^\zeta h^\theta \wedge 1 = D_2^\beta / (g^\eta h^\iota) \wedge \beta \in ]2^{l_e-1}; 2^{l_e}[ \wedge \mu \in I_2^{l_s} \wedge \alpha \in I_N \wedge \epsilon \in I_N \wedge \delta \in I_N)(m)$.

where $I_{sig}$ is said further parameter, f is a public key of the trusted authority, g and h are further elements of the public key of the signer, $D_1$ is still another parameter in accordance with the relationship $D_1 = Ah^{w_1} \pmod{n}$, and $D_2$ is a still additional parameter in accordance with the relationship $D_2 = g^{w_1} h^{w_2} \pmod{n}$, where $w_1$ and $w_2$ are said fourth parameters, $l_2$ is a length parameter in accordance with the relationship $l_e \geq l_r + 2$, where $l_r = \max(l_m, l_N)$, $l_m$ is the bit-length of the message m and $l_N$ is the bit-length of a parameter N, where $N = \lfloor n/4 \rfloor$, and $l_s$ is a length parameter defined in accordance with the relationship $l_s \geq l_n + l_r + l + 3$, where $l_n$ is the bit-length of n, and l is a security parameter defined in accordance with the fair blind signature scheme; and submitting, from the apparatus of the user to a third party, the message m signed in accordance with the fair blind signature scheme, the apparatus of the user submitting to the third party:

said encrypted data $E_3$, $E_4$ a commitment on said another parameter A, and said signature of knowledge.

3. The method of claim 2, wherein said step of generating encrypted data comprises encrypting said first data element in accordance with a key known to the trusted authority, and wherein said step of issuing the signature further comprises disclosing said first data element to the apparatus of the signer so that the trusted authority can determine from a transmitted digital signature the signature-issuing session in which said digital signature was issued.

4. The method of claim 3, further comprising the step of:

providing the trusted authority with said first data element during a registration of the apparatus of the user as a parameter for identifying the apparatus of the user.

5. The method of claim 1, wherein said step of issuing the digital signature further comprises:
providing the apparatus of the signer with encrypted data comprising a data element encrypted in accordance with a key known to the trusted authority; and
disclosing said data element during transmission of the signed message so that the trusted authority can determine from a transcript of a signature-issuing session which digital signature resulted from the session.

6. The method of claim 1, wherein the apparatus of the signer comprises a plurality of entities, the cooperation of a quorum of each of said plural entities being necessary to provide the apparatus of the user with the data to complete said 7-tuple.

7. The method of claim 1, wherein the trusted authority comprises a plurality of trusted authorities and revocation of the anonymity of the digital signature is obtainable by cooperation of a quorum of said plural trusted authorities.

8. A computer-readable medium encoded with a computer program executed on a computing system including a user computing device, a signer computing device and a trusted authority computing device, for causing the computing system to provide a digital signature for a message, comprising:
program code for generating, by the signer computing device, first parameters comprising elements of a public key of the signer;
program code for generating second parameters which are chosen uniformly at random by the signer computing device;
program code for generating third parameters which are chosen uniformly at random by the user computing device;
program code for calculating, by the user computing device, a code to identify said user computing device;
program code for calculating, by the user computing device, an intermediate value based on a parameter chosen uniformly at random by the user computing device and on a parameter chosen uniformly at random by the signer computing device;
program code for calculating, by the user computing device, an additional parameter in accordance with the relationship:

$C_2 = a_1^x a_2^m a_4^t \pmod{n}$; and program code for issuing the digital signature by:
obtaining, by the user computing device, data from the signer computing device to complete a 7-tuple in accordance with the relationship:

$A^e = a_0 a_1^x a_2^m a_3^{x_u} a_4^t a_5^s \pmod{n}$, where $a_0, a_1, a_2, a_3, a_4$ and $a_5$ and $n$ are said first parameters,
m is said message to be signed,
e and s are said second parameters,
t and $x_u$ are said third parameters,
x is said intermediate value,
$Id_U$ is said code which identifies the user computing device,
$C_2$ is said additional parameter, and
A is another parameter calculated in accordance with the relationship:

$A = (a_0 C_2 a_5^s Id_U)^{1/e} \pmod{n}$; and generating, by the user computing device, the digital signature based on said data obtained by the user computing device from the signer computing device.

9. A digital signature generating system configured to implement a fair blind digital signature scheme in which a user interacts with a signer in a signature-issuing phase to obtain the fair blind digital signature of a message, wherein the signer has a public key and anonymity of the digital signature is revocable by a trusted authority, the signature system comprising:
a user apparatus;
signer apparatus; and
trusted authority apparatus;
wherein the user apparatus is configured to cooperate with said signer apparatus to perform a signature-issuing protocol;
wherein the trusted authority apparatus and the signer apparatus are configured to cooperate to perform a tracing protocol;
wherein the user apparatus and the signer apparatus are configured to perform the signature-issuing protocol to provide the user apparatus with data from the signer apparatus to enable said user apparatus to complete a 7-tuple in accordance with the relationship:

$A^e = a_0 a_1^x a_2^m a_3^{x_u} a_4^t a_5^s \pmod{n}$, where $a_0, a_1, a_2, a_3, a_4$ and $a_5$ and $n$ are elements of the public key of the signer and are generated at the signer apparatus,
m is said message to be signed,
e and s are parameters chosen uniformly at random at the signer apparatus,
t and $x_u$ are parameters chosen uniformly at random at the user apparatus,
x is an intermediate value calculated at the user apparatus based on a parameter chosen uniformly at random at the user apparatus and on a parameter chosen uniformly at random at the signer apparatus, and
A is a parameter calculated in accordance with the relationship:

$A = (a_0 C_2 a_5^s Id_U)^{1/e} \pmod{n}$, where $C_2$ is a parameter calculated at the user apparatus in accordance with the relationship:

$C_2 = a_1^x a_2^m a_4^t \pmod{n}$, and $Id_U$ is a code computed at the user apparatus to identify said user apparatus; and
wherein the user apparatus is configured to generate said digital signature based on said data obtained by said user apparatus from the signer apparatus during performance of the signature-issuing protocol.

10. User apparatus configured to participate in a fair blind digital signature scheme in which a user interacts with a signer in a signature-issuing phase to obtain a fair blind digital signature for a message, wherein the signer has a public key and anonymity of the digital signature is revocable by a trusted authority, the user apparatus comprising:
message providing means for providing the message; and
signature request means for emitting to the apparatus of the signer a request for the digital signature of said message according to a predetermined signature-issuing protocol;
wherein the user apparatus is configured to cooperate with the apparatus of the signer to perform said signature-issuing protocol;

wherein performance of said signature-issuing protocol provides the user apparatus with data from the apparatus of the signer to enable said user apparatus to complete a 7-tuple in accordance with the relationship:

$$A^e = a_0 a_1^x a_2^m a_3^{x_u} a_4^t a_5^s \pmod{n},$$

where $a_0$, $a_1$, $a_2$, $a_3$, $a_4$ and $a_5$ and n are elements of the public key of the signer and are generated at the apparatus of the signer, m is said message to be signed, e and s are parameters chosen uniformly at random at the apparatus of the signer, t and $x_u$ are parameters chosen uniformly at random at the user apparatus, x is an intermediate value calculated at the user apparatus based on a parameter chosen uniformly at random at the user apparatus and on a parameter chosen uniformly at random at the apparatus of the signer, and A is a parameter calculated in accordance with the relationship:

$$A = (a_0 C_2 a_5^s Id_U)^{1/e} \pmod{n},$$

where $C_2$ is a parameter calculated at the user apparatus in accordance with the following relationship:

$$C_2 = a_1^x a_2^m a_4^t \pmod{n}, \text{ and}$$

$Id_U$ is a code computed at the user apparatus to identify said user; and wherein the user apparatus comprises digital signature generating means for generating the digital signature of said message based on data obtained by the user apparatus from the apparatus of the signer during performance of said signature-issuing protocol.

11. A computer-readable medium encoded with a computer program executed by a computer which causes a user apparatus to participate in a fair blind digital signature scheme in which the user apparatus interacts with the apparatus of a signer in a signature-issuing phase to obtain a fair blind digital signature for a message, comprising:

program code for providing the message; and program code for emitting to the apparatus of the signer a request for the digital signature of said message according to a predetermined signature-issuing protocol;

wherein the user apparatus is configured to cooperate with the apparatus of the signer to perform said signature-issuing protocol;

wherein performance of said signature-issuing protocol provides the user apparatus with data from the apparatus of the signer to enable said user apparatus to complete a 7-tuple in accordance with the relationship:

$$A^e = a_0 a_1^x a_2^m a_3^{x_u} a_4^t a_5^s \pmod{n},$$

where $a_0$, $a_1$, $a_2$, $a_3$, $a_4$ and $a_5$ and n are elements of the public key of the signer and are generated at the apparatus of the signer, m is said message to be signed, e and s are parameters chosen uniformly at random at the apparatus of the signer, t and $x_u$ are parameters chosen uniformly at random at the user apparatus, x is an intermediate value calculated at the user apparatus based on a parameter chosen uniformly at random at the user apparatus and on a parameter chosen uniformly at random at the apparatus of the signer, and A is a parameter calculated in accordance with the relationship:

$$A = (a_0 C_2 a_5^s Id_U)^{1/e} \pmod{n},$$

where $C_2$ is a parameter calculated at the user apparatus in accordance with the following relationship:

$$C_2 = a_1^x a_2^m a_4^t \pmod{n}, \text{ and}$$

$Id_U$ is a code computed at the user apparatus to identify said user; and wherein the user apparatus comprises digital signature generating means for generating the digital signature of said message based on data obtained by the user apparatus from the apparatus of the signer during performance of said signature-issuing protocol.

12. Signer apparatus configured to participate in a fair blind digital signature scheme in which an apparatus of a user interacts with the signer apparatus in a signature-issuing phase to obtain a fair blind digital signature of a message, wherein the signer has a public key and anonymity of the digital signature is revocable by a trusted authority, the signer apparatus comprising:

request receiving means for receiving, from the apparatus of the user, a request for the digital signature of said message; and signature-protocol-implementation means for cooperating with said apparatus of the user to perform a predetermined signature-issuing protocol;

wherein the signature-protocol-implementation means is configured to perform a signature-issuing protocol which provides the apparatus of the user with data for enabling the apparatus of the user to generate said digital signature and for enabling said apparatus of the user to complete a 7-tuple in accordance with the relationship:

$$A^e = a_0 a_1^x a_2^m a_3^{x_u} a_4^t a_5^s \pmod{n},$$

where $a_0$, $a_1$, $a_2$, $a_3$, $a_4$ and $a_5$ and n are elements of the public key of the signer and are generated at the signer apparatus, m is said message to be signed, e and s are parameters chosen uniformly at random at the signer apparatus, t and $x_u$ are parameters chosen uniformly at random at the apparatus of the user, x is an intermediate value calculated at the apparatus of the user based on a parameter chosen uniformly at random at the apparatus of the user and on a parameter chosen uniformly at random at the signer apparatus, and A is a parameter calculated in accordance with the relationship:

$$A = (a_0 C_2 a_5^s Id_U)^{1/e} \pmod{n},$$

where $C_2$ is a parameter calculated at the user apparatus in accordance with the following relationship:

$$C_2 = a_1^x a_2^m a_4^t \pmod{n}, \text{ and}$$

$Id_U$ is a code computed at the user apparatus to identify said apparatus of the user.

13. A computer-readable medium encoded with a computer program executed on a computer apparatus which causes the computer apparatus to function as a signer apparatus and participate in a fair blind digital signature scheme in which an apparatus of a user interacts with the signer apparatus in a signature-issuing phase to obtain the fair blind digital signature for a message, comprising:

program code for receiving, from the apparatus of the user, a request for the digital signature of said message; and program code for cooperating with said apparatus of the user to perform a predetermined signature-issuing protocol;

wherein the program code for cooperating with said apparatus of the user to perform the predetermined signature-issuing protocol causes execution of the signature-issuing protocol which provides the apparatus of the user with data for enabling the apparatus of the user to generate said digital signature and for enabling said apparatus of the user to complete a 7-tuple in accordance with the relationship:

$$A^e = a_0 a_1^x a_2^m a_3^{x_u} a_4^t a_5^s (\bmod n),$$

where $a_0, a_1, a_2, a_3, a_4$ and $a_5$ and n are elements of a public key of a signer of the message and are generated at the signer apparatus, m is said message to be signed, e and s are parameters chosen uniformly at random at the signer apparatus, t and $x_u$ are parameters chosen uniformly at random at the apparatus of the user, x is an intermediate value calculated at the apparatus of the user based on a parameter chosen uniformly at random at the apparatus of the user and on a parameter chosen uniformly at random at the signer apparatus, and A is a parameter calculated in accordance with the relationship:

$$A = (a_0 C_2 a_5^s Id_U)^{1/e} (\bmod n),$$

where $C_2$ is a parameter calculated at the user apparatus in accordance with the relationship:

$$C_2 = a_1^x a_2^m a_4^t (\bmod n), \text{ and}$$

$Id_U$ is a code computed at the user apparatus to identify said apparatus of the user.

14. Trusted authority apparatus configured to participate in a fair blind digital signature scheme in which an apparatus of a user interacts with an apparatus of a signer in a signature-issuing phase to obtain a fair blind digital signature for a message, the signer having a public key;

wherein said trusted authority apparatus is configured to revoke anonymity of a digital signature issued according to a signature-issuing protocol whose performance provides the apparatus of the user with data from the apparatus of the signer for enabling said apparatus of the user to generate the digital signature and for enabling the apparatus of the user to complete a 7-tuple in accordance with the relationship:

$$A^e = a_0 a_1^x a_2^m a_3^{x_u} a_4^t a_5^s (\bmod n),$$

where $a_0, a_1, a_2, a_3, a_4$ and $a_5$ and n are elements of the public key of the signer and are generated by the apparatus of the signer, m is said message to be signed, e and s are parameters chosen uniformly at random by the apparatus of the signer, t and $x_u$ are parameters chosen uniformly at random by the apparatus of the user, x is an intermediate value calculated by the apparatus of the user based on a parameter chosen uniformly at random by the apparatus of the user and on a parameter chosen uniformly at random by the apparatus of the signer, and A is a parameter calculated in accordance with the relationship:

$$A = (a_0 C_2 a_5^s Id_U)^{1/e} (\bmod n),$$

where $C_2$ is a parameter calculated by the apparatus of the user in accordance with the relationship:

$$C_2 = a_1^x a_2^m a_4^t (\bmod n), \text{ and}$$

$Id_U$ is a code computed by the user to identify said apparatus of the user.

15. A computer-readable medium encoded with a computer program executed on a computer apparatus which causes the computer apparatus to function as a trusted authority apparatus and participate in a fair blind digital signature scheme in which an apparatus of a user interacts with an apparatus of a signer in a signature-issuing phase to obtain a fair blind digital signature for a message, wherein the signer has a public key, comprising:

program code for revoking anonymity of a digital signature issued according to a signature-issuing protocol whose performance provides the apparatus of the user with data from the apparatus of the signer for enabling said apparatus of the user to generate the digital signature and for enabling the apparatus of the user to complete a 7-tuple in accordance with the relationship:

$$A^e = a_0 a_1^x a_2^m a_3^{x_u} a_4^t a_5^s (\bmod n),$$

where $a_0, a_1, a_2, a_3, a_4$ and $a_5$ and n are elements of the public key of the signer and are generated by the apparatus of the signer, m is said message to be signed, e and s are parameters chosen uniformly at random by the apparatus of the signer, t and $x_u$ are parameters chosen uniformly at random by the apparatus of the user, x is an intermediate value calculated by the apparatus of the user based on a parameter chosen uniformly at random by the apparatus of the user and on a parameter chosen uniformly at random by the apparatus of the signer, and A is a parameter calculated in accordance with the relationship:

$$A = (a_0 C_2 a_5^s Id_U)^{1/e} (\bmod n)$$

where $C_2$ is a parameter calculated by the apparatus of the user in accordance with the relationship:

$$C_2 = a_1^x a_2^m a_4^t (\bmod n), \text{ and}$$

$Id_U$ is a code computed by the user to identify said apparatus of the user.

* * * * *